United States Patent [19]
Castricum

[11] Patent Number: 5,636,541
[45] Date of Patent: Jun. 10, 1997

[54] APPARATUS FOR FORMING AND CUTTING SPIRAL PIPE

[75] Inventor: Wilhelmus P. H. Castricum, Palatine, Ill.

[73] Assignee: Lindab AB, Båstad, Sweden

[21] Appl. No.: 494,027

[22] Filed: Jun. 23, 1995

[51] Int. Cl.$^6$ .............................. B21C 37/12; B21F 11/00
[52] U.S. Cl. .................................................. 72/49; 72/132
[58] Field of Search .................................. 72/49, 50, 52, 72/129, 132, 135; 83/318, 54, 444; 82/54, 82, 53.1

[56] References Cited

U.S. PATENT DOCUMENTS

| | | |
|---|---|---|
| 549,707 | 11/1895 | Denney . |
| 684,539 | 10/1901 | Cartwright ................................ 83/308 |
| 957,966 | 7/1910 | Jenkins . |
| 1,635,807 | 1/1927 | Amberg . |
| 2,516,817 | 7/1950 | Wernli . |
| 3,029,674 | 6/1962 | Southwell et al. . |
| 3,268,137 | 8/1966 | Martin . |
| 3,540,333 | 11/1970 | Johnson . |
| 3,831,470 | 8/1974 | Maroschak ................................ 83/39 |
| 3,839,931 | 10/1974 | Herpich ................................ 82/54 |
| 3,839,933 | 10/1974 | Paramonoff ................................ 82/61 |
| 3,866,501 | 2/1975 | Glendenning et al. ................. 83/382 |
| 3,913,430 | 10/1975 | van Dijk ................................ 82/82 |
| 4,567,742 | 2/1986 | Castricum ................................ 72/50 |
| 4,706,481 | 11/1987 | Castricum ................................ 72/49 |
| 4,711,110 | 12/1987 | Castricum ................................ 72/49 |
| 4,823,579 | 4/1989 | Castricum ................................ 72/49 |
| 4,924,684 | 5/1990 | Castricum ................................ 72/49 |
| 4,934,225 | 6/1990 | Languillat et al. ..................... 82/53.1 |
| 4,987,808 | 1/1991 | Sicka et al. ............................... 83/13 |
| 5,063,798 | 11/1991 | Kitaoka et al. .......................... 82/124 |
| 5,086,677 | 2/1992 | Languillat ................................ 82/92 |
| 5,105,639 | 4/1992 | Castricum ................................ 72/49 |
| 5,105,700 | 4/1992 | Kusakabe ................................ 83/318 |
| 5,193,374 | 3/1993 | Castricum ................................ 72/49 |
| 5,243,889 | 9/1993 | Wallis ................................ 83/303 |
| 5,257,521 | 11/1993 | Castricum ................................ 72/131 |
| 5,335,570 | 8/1994 | Ro ................................ 82/48 |

FOREIGN PATENT DOCUMENTS

| | | |
|---|---|---|
| 0353622 | 7/1989 | European Pat. Off. . |
| 0499915A1 | 8/1992 | European Pat. Off. . |
| 0714713A1 | 11/1995 | European Pat. Off. . |
| 0714713A1 | 6/1996 | European Pat. Off. . |
| 2724859A1 | 12/1978 | Germany . |
| 5380881 | 7/1978 | Japan . |
| 718424 | 4/1951 | United Kingdom ................ 82/53.1 |
| 749389 | 11/1954 | United Kingdom ................ 164/64.1 |

OTHER PUBLICATIONS

European Search Report of EP 96 30 3587 dated Sep. 24, 1996.

Primary Examiner—Lowell A. Larson
Assistant Examiner—Rodney A. Butler
Attorney, Agent, or Firm—Brinks Hofer Gilson & Lione

[57] ABSTRACT

An improved apparatus for forming and cutting spirally formed pipe, particularly spiral pipes having a diameter of approximately one inch or less, is disclosed. The device for slitting the spiral pipe into sections includes a first knife that is positioned inside the spiral pipe and a second knife positioned outside of the pipe. A support sleeve is also positioned outside of the pipe and is in a fixed radial position with respect to the pipe. The inner and outer knives and the support sleeve move axially with the pipe as the pipe is severed.

19 Claims, 9 Drawing Sheets

APPARATUS FOR FORMING AND CUTTING SPIRAL PIPE

BACKGROUND OF THE INVENTION

This invention relates to an improved apparatus for producing spirally formed pipe, particularly spiral pipes having a diameter of approximately one inch or less.

A large potential for small diameter spiral pipes exists in the filter market, such as automobile oil filters. These filters typically have a perforated inner metal cylinder that is approximately one inch in diameter. Because pipes such as those used in oil filters need to be accurately and cleanly cut in large quantities, a pipe forming and cutting apparatus capable of fast and accurate cuts is necessary.

There are several known ways to form and cut a pipe. A pipe may be formed by spirally or helically winding a continuous strip of metal, and joining adjacent edges of the wound strip to form a spiral lockseam in the pipe. In some pipe forming and cutting machines, the spirally formed pipe is cut by moving a knife outside the pipe into an overlapping position with a knife inside the pipe. Other types of spiral pipe forming and cutting machines use multiple knives or rotate the knives around the pipe to cut the pipe into sections.

The accuracy of a cut depends upon minimizing the deflection of the pipe when the cutting knife or knives are engaged. In some pipe forming and cutting machines, the pipe may be supported by one or more rollers, opposite the outside knife, to counteract the force of the knives engaging in a cut. The support roller may be pneumatically or hydraulically driven to move the roller into and out of a support position.

Support rollers, while providing support against deflection in the direction of the force of the cutting knife, do not provide support for lateral deflection of a pipe during the cutting process. Rollers tend to require numerous parts as well as pneumatic or hydraulic systems that may be both costly and bulky. Furthermore, the pipe cutting process may be slower and less accurate than desired due to the time necessary to move the support rollers into a supporting position against a pipe. Accordingly, a pipe forming and cutting machine is necessary with improved lateral pipe support while cutting and that is both faster and more accurate.

SUMMARY OF THE INVENTION

The present invention is directed to an improved apparatus for forming and cutting a spiral pipe. More particularly, the present invention relates to an apparatus having improved support for pipe that is being cut into a section.

According to one aspect of the present invention, the cutting apparatus preferably includes a first rotatable knife to be positioned inside of the spiral pipe, a second rotatable knife to be positioned outside of the pipe, and a support assembly that is secured in a fixed radial position with respect to the pipe. Means, preferably a pneumatically driven assembly, for moving the outer knife into an overlapping relationship with the inner knife move the outer knife into a cutting position while the support assembly guides and supports the pipe. The apparatus also includes guide means, preferably a pneumatically driven assembly, for moving the overlapping knives and support assembly axially with the pipe. The knives and support assembly cooperate to cut the pipe as the pipe moves axially and rotates between the overlapping inner and outer knives. According to another aspect of the invention, the support assembly surrounds the outside of the pipe and has a recessed portion defining a gap to allow the outer knife to move into an overlapping position with the inner knife.

The present invention provides significant advantages over conventional methods for making spirally formed pipes, such as longitudinal filter pipes. The cutting process may be accelerated with the cutting apparatus of the present invention. Moreover, the support assembly provides greater lateral stability to the pipe as it is cut. The present invention also permits a less expensive forming and cutting apparatus to be built.

The invention itself, together with further objects and attendant advantages, will be best understood by reference to the following detailed description taken in conjunction with the drawings.

DETAILED DESCRIPTION OF THE PRESENTLY PREFERRED EMBODIMENTS

Figure 1:
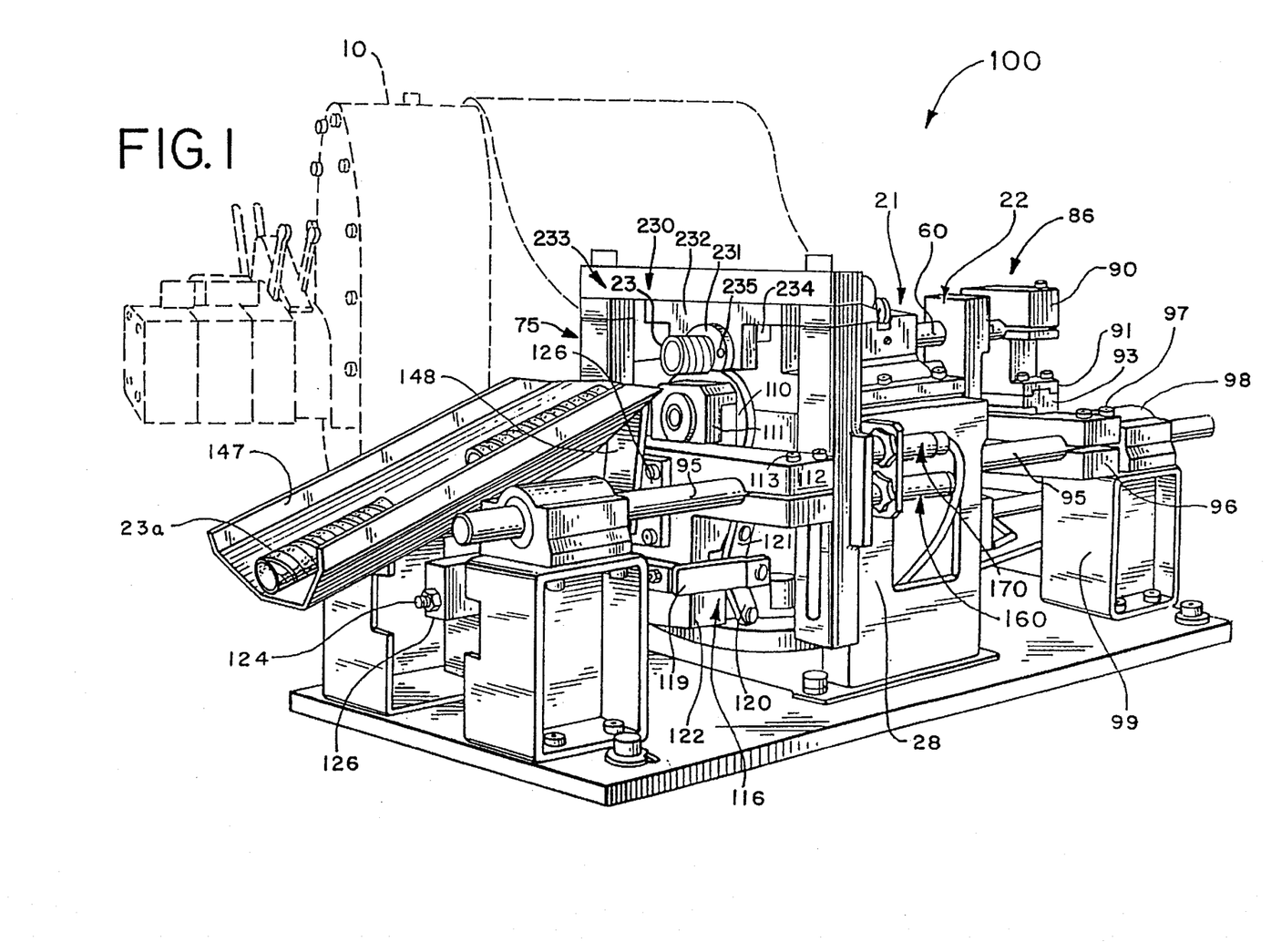
FIG. 1 is a perspective view of the back and right sides of the preferred embodiment of the present invention.
Figure 2:
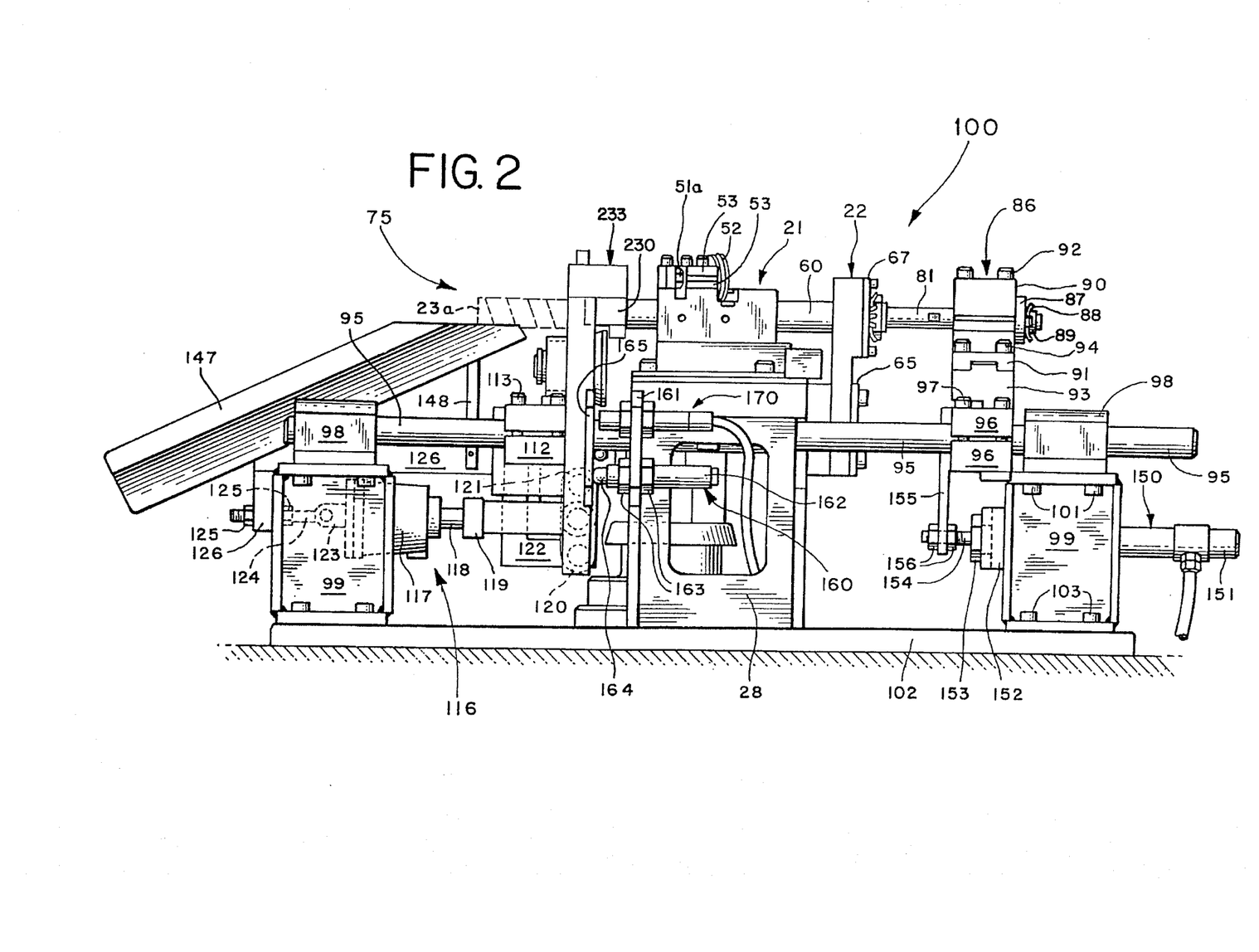
FIG. 2 is an elevation view of the back side of the preferred embodiment of the present invention.
Figure 3:
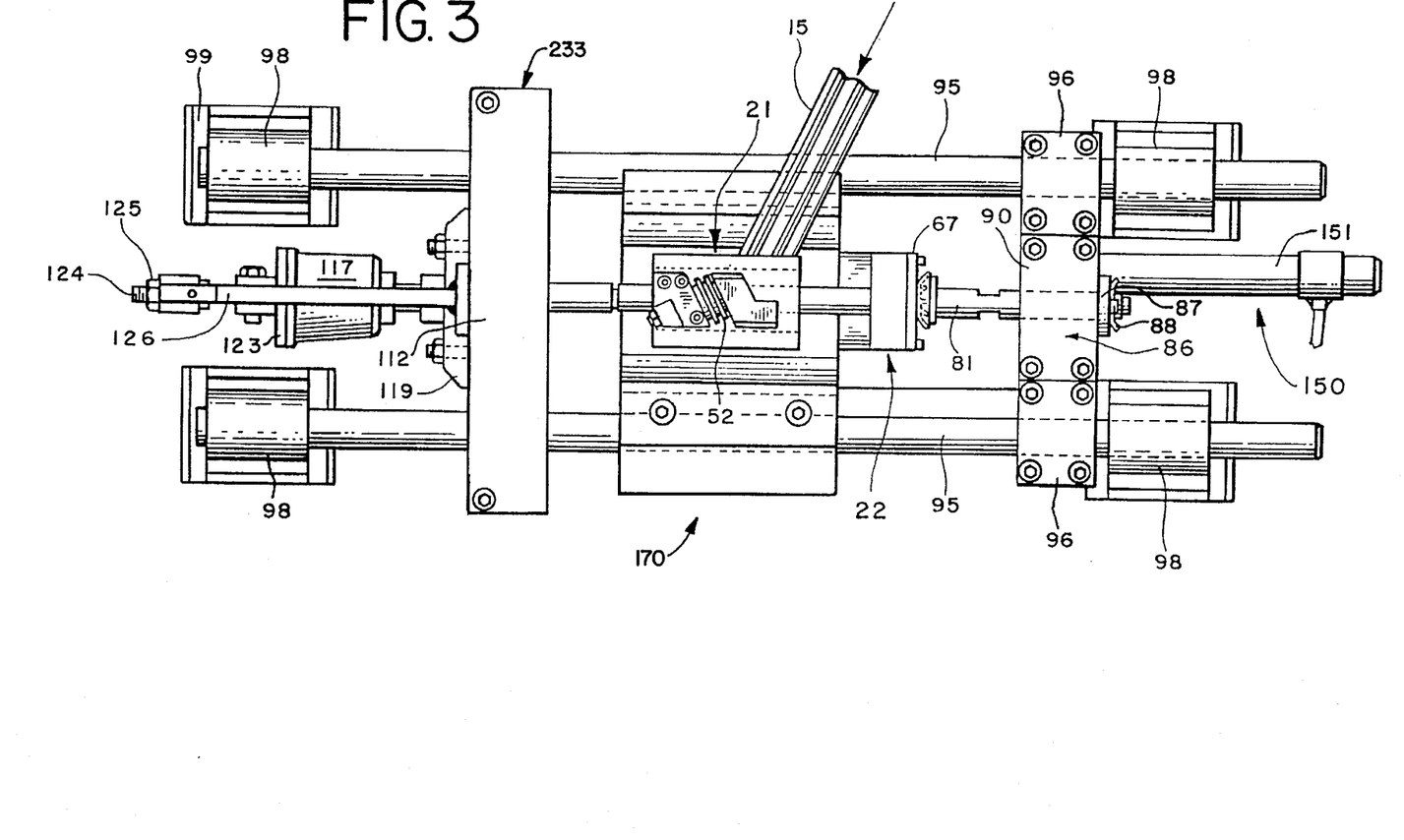
FIG. 3 is a plan view of the preferred embodiment of the present invention.

Referring now to the drawings, FIGS. 1 and 2 show the combination 100 of the spiral pipe forming apparatus 10 and improved slitter 75 of the present invention. Many elements of the pipe forming machine 10 are conventional, and are described in greater detail in U.S. Pat. No. 4,567,742, issued Feb. 4, 1986. The description of the pipe forming apparatus disclosed in that patent is incorporated by reference herein, and made a part hereof. Many of the parts disclosed therein can be used in the present pipe forming machine 10 with some adaptation to accommodate the one and one-half inch wide strip 15 and its particular edge and corrugation configurations that are used in the present pipe forming machine 10.

Figure 8:
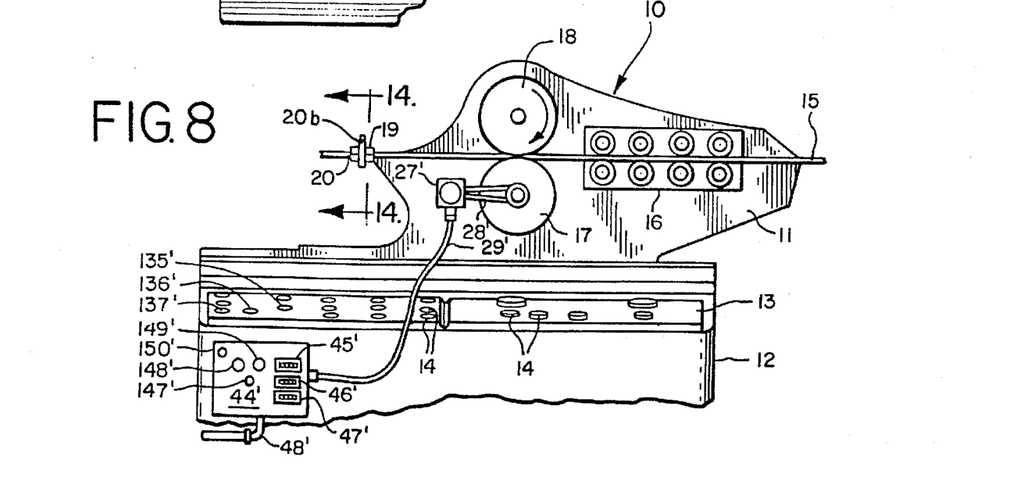
FIG. 8 is a side elevational view of a part of a spiral pipe forming machine which is used with the preferred embodiment of the present invention.
Figure 9A:
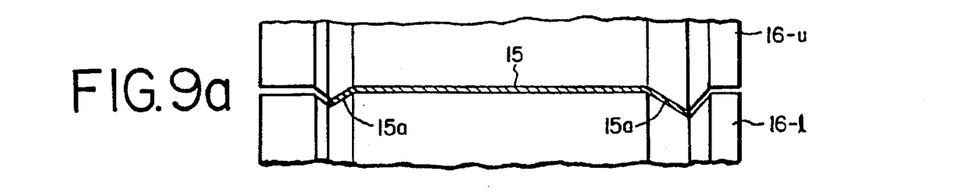
FIG. 9a–9e are sectional views of the edge forming and corrugation rollers that are used in the spiral pipe forming machine which is used with the preferred embodiment of the present invention, with the strip edge configuration illustrated between the rollers.
Figure 9B:
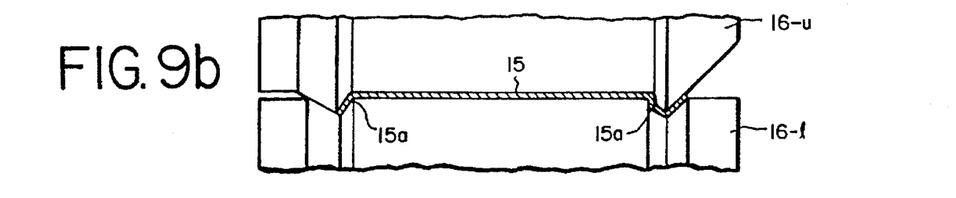
Figure 9C:
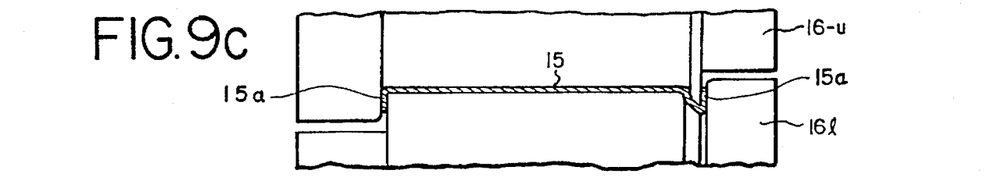
Figure 9D:
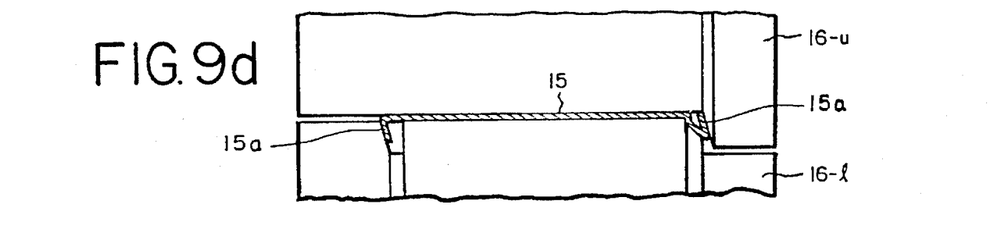
Figure 9E:
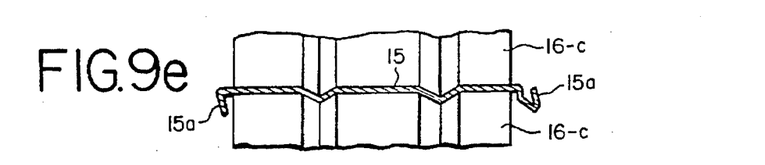

FIG. 8 shows some of the elements of the pipe forming machine 10. The machine includes a frame 11 and a control cabinet 12. A control panel 13 contains a plurality of control elements 14, such as knobs, gauges and dials, for controlling and monitoring the operation of the pipe forming machine 10 and the slitter 75. The functions of the various control elements are described in my U.S. Pat. No. 4,706,481, issued Nov. 17, 1987. The descriptions of the control elements contained in that patent are incorporated by reference herein, and made a part hereof.

A continuous metal strip 15 is fed into the frame 11 of the pipe forming machine 10. To make one inch diameter filter pipe, the strip 15 is preferably 1.5 inches wide and perforated. The strip 15 can be perforated before entering the pipe forming machine 10, or by a perforating drive roller in the pipe forming machine 10. If the pipe diameter increases, a wider strip 15 can be used and is preferred.

The metal strip 15 passes through a roller housing 16 that contains a plurality of rollers that bend the edges of the strip 15a into a predetermined shape for forming the lockseam, and that form corrugation grooves in the metal strip. FIGS. 9a–9e show the upper edge forming rollers 16-u, the lower edge forming rollers 16-1, and corrugation rollers 16-c that are preferably used for forming the strip edges and corrugations for forming one inch diameter filter pipe. The strip 15 first passes through the rollers shown in FIG. 9a, and successively through the rollers shown in FIG. 9b through FIG. 9e. Further information about the function and operation of the edge forming rollers and corrugation rollers is disclosed in my U.S. Pat. No. 4,567,742, which is incorporated by reference herein and made a part hereof.

Figure 10:
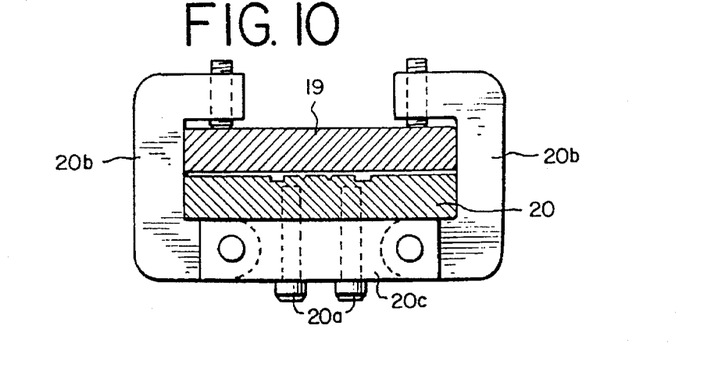
FIG. 10 is a sectional view of the guide plates and clamping members that are used in the spiral pipe forming machine which is used with the preferred embodiment of the present invention.

A lower drive roller 17 and an upper drive roller 18 are rotatably mounted in the frame 11. The drive rollers cooperate to pull the metal strip 15 into the frame 11 and through the roller housing 16. The two drive rollers 17, 18 then push the metal strip 15 between the upper guide plates 19 and lower guide plates 20. The width of the drive rollers 17, 18 and the guide plates should be adapted to conform to the width of the strip 15. As shown in FIG. 10, the lower guide plates 20 are secured to the frame 11 by bolts 20a. The lower guide plate 20 also contains grooves to accommodate the corrugations and edges formed in the strip 15. Clamps 20b are pivotally connected to a base 20c that is attached to the frame 11. The clamps 20b hold the upper guide plates 19 against the lower guide plates 20.

Referring now to FIGS. 1 through 5, a forming head assembly 21 and a mandrel assembly 22 cooperate to form the metal strip 15 into a spiral pipe 23. The forming head assembly 21 includes a base 27 which is detachably secured to a forming head table 28. A clamp 26 is used to secure the forming head base 27 to the forming head table 28.

Figure 5:
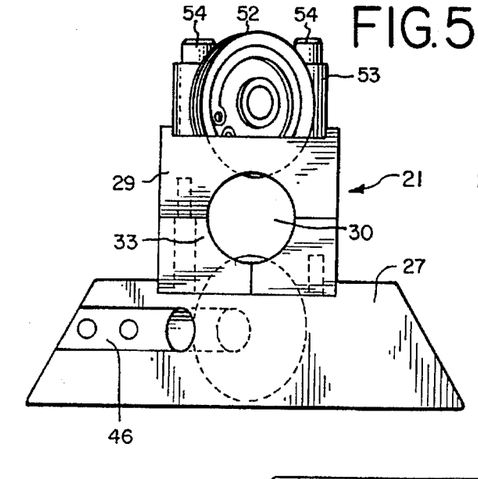
FIG. 5 is a left side, elevational view of the forming head assembly of the preferred embodiment of the present invention.
Figure 6:
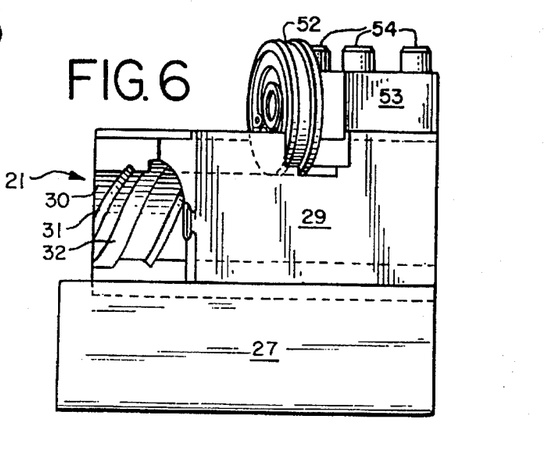
FIG. 6 is an front, elevational view of the forming head assembly of the preferred embodiment of the present invention.
Figure 7:
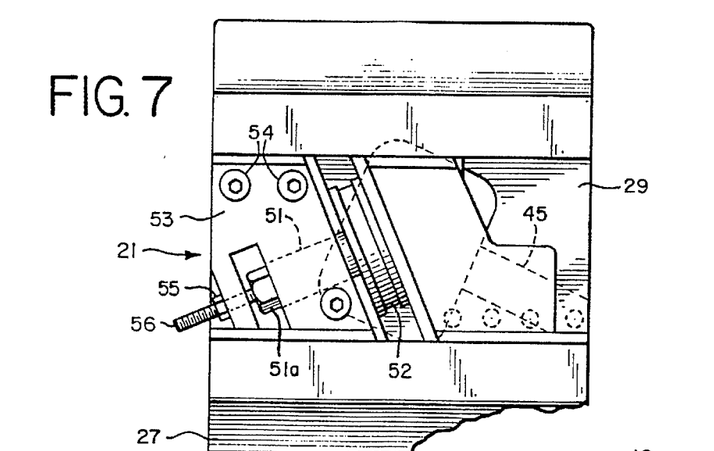
FIG. 7 is a plan view of the top side of the forming head assembly of the preferred embodiment of the present invention.

As best shown in FIGS. 5 and 6, the forming head assembly 21 also includes a forming head 29 which is bolted to the forming head base 27. The forming head 29 is enclosed around a lateral bore 30. The metal strip 15 is formed inside of the lateral bore 30 into a spiral pipe having a diameter of approximately one inch. Helical grooves 31 are cut into the forming head 29 to accommodate the corrugations on the helically-wound strip and the spiral pipe 23. Deeper helical grooves 32 are provided for the formed edges 15a of the strip 15 and the resulting lockseam 24. The inner grooves 31 and 32 help guide the helically-wound strip 15 and spiral pipe 23 through the forming head 29. The inner diameter of the lateral bore 30 determines the outer diameter of the spiral pipe 23. If the diameter of the spiral pipe is to be varied, a forming head 29 with a different diameter lateral bore 30 should be used. Interchangeable forming heads with different diameter lateral bores can be used in the preferred embodiment of the present invention. In one embodiment, the pipe forming apparatus of the present invention may be used to make spiral filter pipe one to two inches in diameter from a one and one-half inch wide perforated metal strip 15. It is expected that spiral pipe as small as seventh-eighths of an inch (⅞ inch) in diameter can be made with the pipe forming apparatus 10 of the present invention. Of course, the present invention is not limited to making perforated filter pipe and may also be modified to produce larger or smaller pipe diameters.

The forming head 29 mates with a removable inset 33. The inset 33 is held in place by pins (not shown). The radius of curvature of the removable inset 33 is smaller than the radius of curvature of the lateral bore 30. The inner surface of the removable inset 33 can be coated with a friction reducing material. The removable inset 33 is intended to prevent the metal strip 15 from locking up as it is driven around the lateral bore 30 of the forming head 29.

Referring to FIGS. 1, 2 and 5, the spiral pipe 23 is not only formed inside the enclosed forming head 29, but at the same time is formed around a completely cylindrical mandrel 60. The clearance between the mandrel 60 and the surface of the lateral bore 30 in the forming head 29 is approximately twice the thickness of the metal strip, plus 0.006–0.003 inches each side. The closely controlled clearance between the mandrel 60 and enclosed forming head 29 provides greater accuracy in producing pipe having a consistent diameter. If there is too much clearance, the strip 15 will buckle in the forming head. If there is too little clearance, the strip 15 will lock up inside the forming head. For a more detailed discussion of a suitable pipe forming apparatus, reference is made to my U.S. Patent No. 4,924,684 issued May 15, 1990. The entire disclosure of U.S. Pat. No. 4,924,684 is incorporated by reference.

The preferred embodiment of the present invention also includes an apparatus for slitting the spiral pipe made with the pipe forming apparatus 10. The present slitting apparatus 75 includes many elements of the slitting apparatus disclosed in U.S. Pat. No. 4,706,481 and U.S. Pat. No. 4,924,684. The descriptions of the slitting apparatus contained in these patents are incorporated by reference herein and made a part hereof.

Referring now to FIGS. 1–4, an inner knife 80 is attached to a boom 81 with a bolt 82. A washer 83 is positioned between the bolt 82 and the inner knife 80. The inner knife 80 has an oversized central opening 84 (not shown), which permits the position of the inner knife to be adjusted in any radial direction relative to the inner surface of the spiral pipe 23. In general, the knife 80 will be centered within the spiral pipe 23. It is most preferred that the inner knife can be centered within the pipe without an oversized opening 84.

The boom 81 passes through the mandrel 60, and is free floating within the mandrel 60. Thus, the boom 81 does not necessarily rotate with the mandrel, but is designed to rotate only during this slitting process. The boom is preferably passively rotatable, i.e., it is rotationally driven by the overlapping inner knife 80 and outer knife 110 during the slitting process. To provide the passive rotation, the end of the boom 81 opposite the inner knife 80 is surrounded by combination needle/thrust bearings (not shown). These needle/thrust bearings can be obtained from IKO Bearings, of Arlington Heights, Ill. The bearings are held in a boom holder assembly 86 by an annular support member 87, a lock washer 88, and a lock nut 89.

The boom holder assembly 86 has an upper section 90 and a lower section 91. Each section has a central semi-cylindrical cavity which abuts the annular support member 87. The upper section 90 and the lower section 91 are clamped to each other by a plurality of allen bolts 92. The lower section 91 is mounted on an attachment block 93, and fixed thereto by allen bolts 94. The attachment block 93 passes between guide shafts 95, and is secured to a shaft connector 96 by allen bolts (not shown). A plurality of allen bolts 97 squeezed together the ends of the shaft connector 96 around the guide shafts 95, so that the shaft connector 96 slides axially with the guide shafts 95. The guide shafts 95 pass through openings in the forming head table 28, and slide through the bearing housings 98, which include THK Slide Bearing SC 30 assemblies. There are four such bearing housings 98, each of which is attached to the top of a mounting leg 99 by allen bolts 101. The four mounting legs 99 are provided to support the mandrel assembly 22 and the slitting apparatus 75 at the correct height with respect to the forming head table 28 and the pipe 23. The mounting legs 99 are attached to the base plate 102 by allen bolts 103. The base plate 102 is attached to the pipe forming machine 10. Oval pivot slots (not shown) are provided in the base plate 102, so that the pipe cutting apparatus can be pivoted about the center of the inner knife 80. Most of the bolts that connect the various components of the boom assembly 86 pass through oval slots so that the position of the components can be adjusted relative to each other.

An outer knife 110 is generally positioned below the inner knife 80 and outside of the pipe 23. The outer knife is held in a vertical holder 111 by a lock washer and lock nut 114 that are connected to the shaft of the knife. Bearings (not shown) permit the outer knife 110 to be passively rotatable, that is, rotationally driven by contact with the rotating pipe 23. The vertical holder 111 is attached to a slide bearing assembly 111a, (e.g., THK Roller Table Type VRM 3105A). The slide bearing assembly 111a is also attached to the central portion of a knife slide block 112. The vertical holder 111 and outer knife 110 can thus slide up and down relative to the knife slide block 112. The knife slide block 112 has two cylindrical openings through which the guide shafts 95 pass. A plurality of allen bolts 113 squeeze together the sides of these openings around the shafts 95, so that the knife slide block 112 is also affixed to and slides axially with the guide shafts 95.

During the pipe forming process, the outer knife 110 must be maintained in a standby position, where it will not interfere with the spirally moving pipe 23. When it is time to cut the pipe, the outer knife blade is moved to a cutting position, where it punctures the spiral pipe 23 and overlaps the inner knife 80 (see, e.g., FIG. 13).

The outer knife blade 110 is moved into and out of its cutting position by the pneumatic cylinder assembly 116. This assembly includes a pneumatic cylinder 117 that controls a piston 118. A lower clevis 119 is attached to the piston 118 and a set of links 120, 121. The lower links 120 are pivotally connected to the clevis 119 and an arm 122 which is integral with and extends from the central portion of the knife slide block 112. The upper toggle links 121 are pivotally connected to the clevis 119 and the bottom of vertical holder 111. Thus, when the piston 118 is fully extended, the vertical holder 111 and outer knife 110 will be raised vertically into the cutting position where the cutting edges of the inner and outer knives overlap and puncture the pipe 23. (See FIGS. 2 and 4) When the piston 118 is retracted into the cylinder 117, the toggle links 120 and 121 will collapse and pull down the vertical holder 111 and the outer knife 110 to the standby position. (See FIG. 1).

An upper clevis 123 is attached to the top of the cylinder 117. The upper clevis 123 is pivotally connected to a threaded shaft 124. Nuts 125 secure the threaded shaft 124 to one end of a cylinder support bracket 126. The other end of the cylinder support bracket 126 is attached to the central position of the knife slide block 112. (The vertical holder 111 and slide bearing assembly 111a are connected to the opposite side of the knife slide block 112.) As a result of its connection to the knife slide block 112, the cylinder support bracket 126 and other components of the pneumatic cylinder assembly 116 move axially with the guide shafts 95. The threaded shaft 124 of the pneumatic cylinder assembly 116 permits adjustment of the standby and cutting positions of the lower knife 110.

As shown in FIG. 1, the slitting apparatus 75 of the present invention also includes a pipe support assembly 230. The support assembly 230 includes a support sleeve 231 mounted on a sleeve holder 232. The sleeve is removably affixed to the sleeve holder 232 by bolts 235. The sleeve holder 232 is secured to an upper bracket 233 by bolts 234 extending vertically through the sleeve holder 232 and upper bracket 233 such that it is fixed in a radial direction with respect to the pipe 23.

Figure 12:
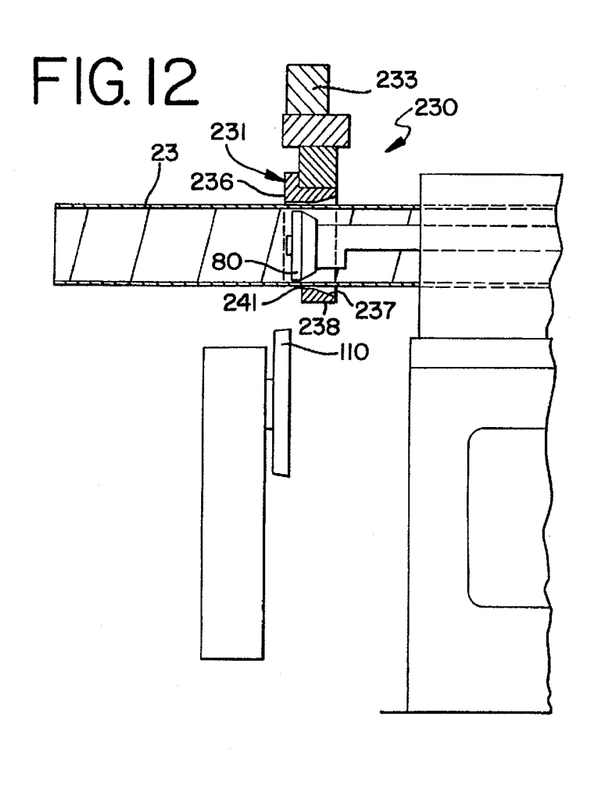
FIG. 12 is a cross-sectional view taken along line 12—12 of FIG. 11.
Figure 13:
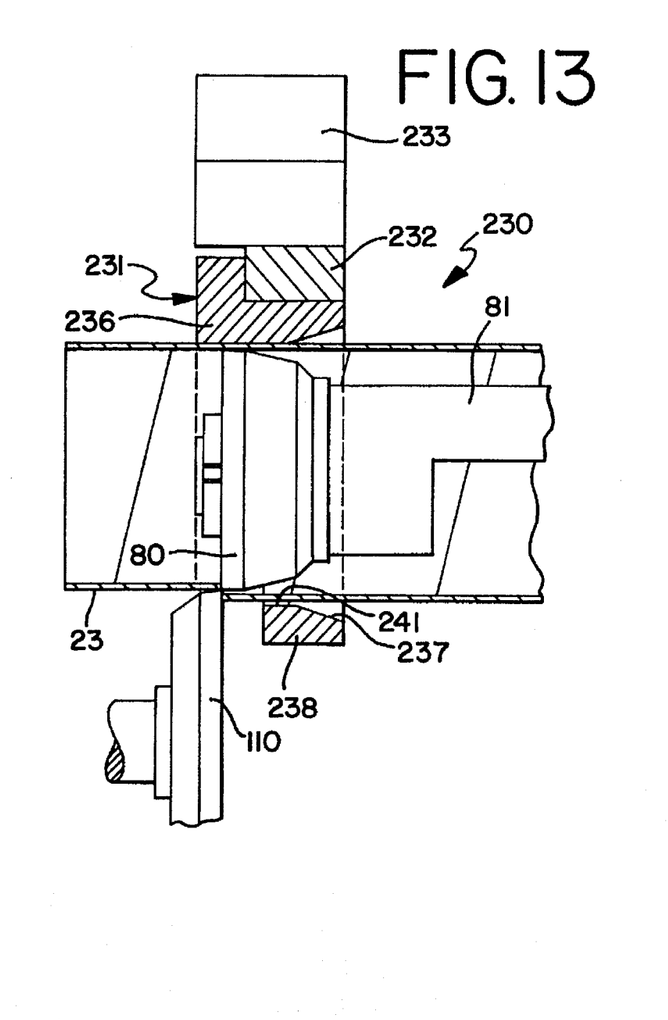
FIG. 13 is a fragmentary side view of the upper bracket and pipe support assembly of FIG. 11 with the outer knife in a cutting position.
Figure 14:
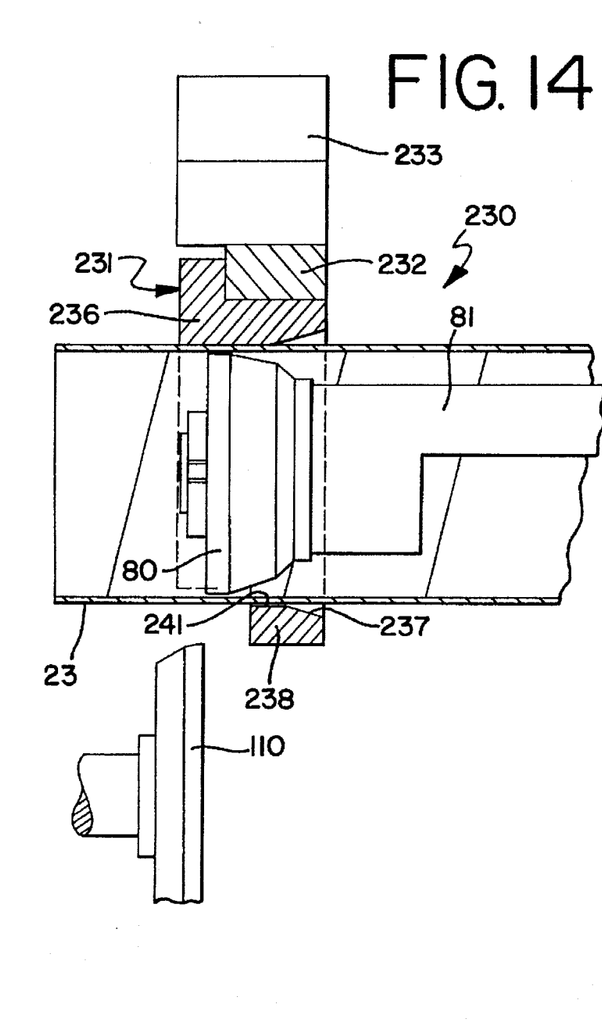
FIG. 14 is a fragmentary side view of the upper bracket and pipe support assembly of FIG. 11 with the outer knife in a stand-by position.

During the pipe forming process, the support assembly 230 is maintained in a fixed position where it does not interfere with the spirally moving pipe 23 (see, e.g., FIGS. 12 and 14). When it is time to cut the pipe and the outer knife 110 is moved to its cutting position, the support sleeve 231 will keep the pipe from being deflected where it contacts the spiral pipe (see, e.g., FIG. 13). The support sleeve 231 is positioned at the end of the pipe and preferably surrounds the pipe. The support sleeve 231 thus operates to prevent the boom 81 from deflecting upward or laterally in response to the force exerted by the outer knife 110. Additionally, the sleeve prevents the pipe material at the cut end from flaring out as it is being cut.

With small diameter pipes (i.e., approximately 1 inch), it is difficult to keep the boom 81 rigid when the outer knife 110 engages the pipe 23. If the boom 81 deflects away from the outer knife 110 during the cutting process, the inner and outer knives will move apart and not overlap to cut the pipe. The support sleeve 231, by limiting any deflection of the pipe, maintains the inner and outer knives in an overlapping relationship during the slitting process.

Figure 11:
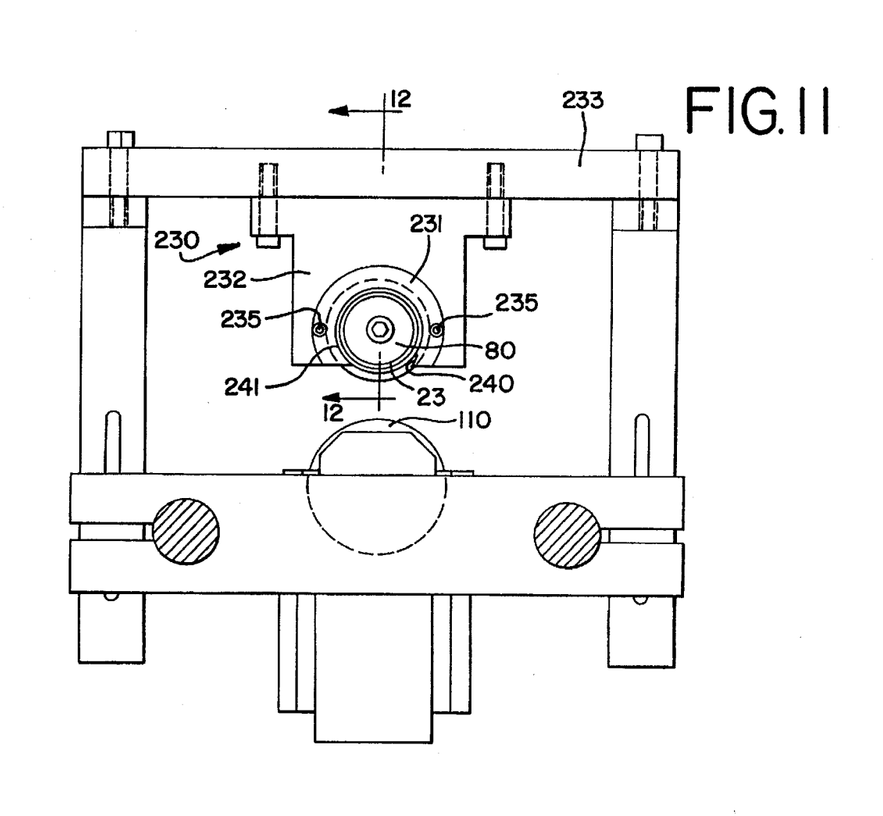
FIG. 11 is a front, sectional view of an upper bracket and pipe support assembly for use in the apparatus of FIG. 1.

The support sleeve 231 is preferably constructed from a heat treated steel such as AIFI A2 steel. Referring to FIG. 11, the sleeve 231 substantially surrounds the pipe material to be cut. The sleeve is configured such that a predetermined distance, preferably 0.005 inch, is maintained between the outer diameter of the pipe and the inner diameter of the sleeve. The sleeve therefore preferably has an inner diameter 241 that is 0.01 inches greater than the predetermined outer diameter of the pipe being cut. Different size support sleeves 231 may be constructed to accommodate specific pipe diameter requirements.

In one embodiment, the sleeve 231 surrounds the entire circumference of the pipe where the pipe enters the sleeve and surrounds approximately 270 degrees of the pipe's circumference leaving a gap where the outer knife engages the pipe. In another embodiment, the sleeve may surround the entire circumference of the pipe and not have a gap. When the embodiment of a sleeve with no gap is used, the outer knife engages the pipe outside of the sleeve.

FIGS. 12–14 illustrate the extended upper portion 236 of the sleeve. The upper portion of the sleeve 232, opposite the outer knife 110, preferably has a width of 1.5 inches extending axially from approximately 1.3 inches behind the cutting edge of the inner knife 80 toward the pipe forming portion of the apparatus to approximately 0.2 inches past the cutting edge of the inner knife. The sleeve also includes a beveled or tapered receiving edge 237. The tapered receiving edge preferably extends around the entire inner diameter of the sleeve and aids in guiding the pipe through the sleeve. The recessed lower portion 238 of the sleeve 231 permits necessary clearance for the outer knife 110 to engage the pipe 23.

Figure 15:
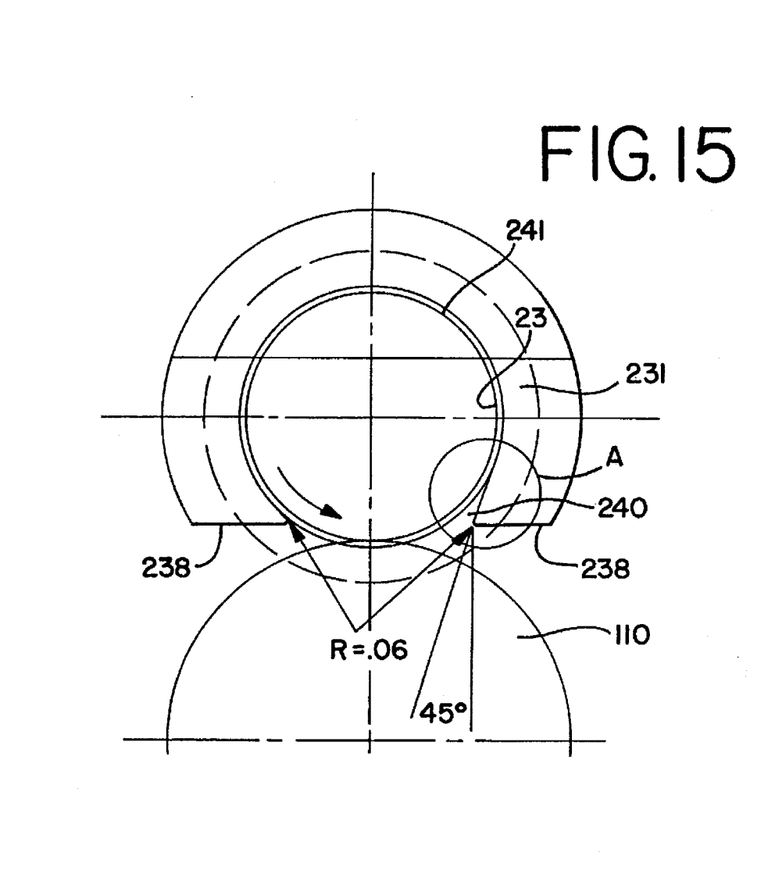
FIG. 15 is a front sectional view of a support assembly for use in the apparatus of FIG. 1.
Figure 16:
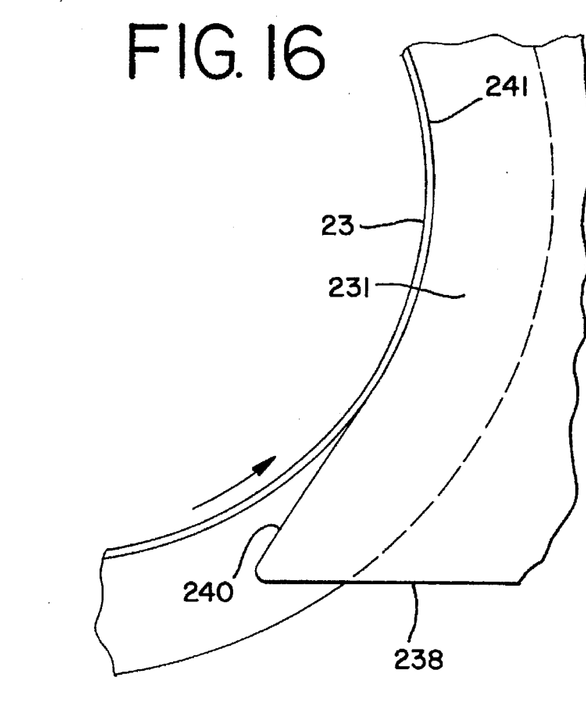
FIG. 16 is a magnified view of inset A of FIG. 15.

As best shown in FIGS. 15 and 16, the support sleeve 231 also preferably includes an angled edge 240. The angled edge 240 is positioned on one side of the recessed lower portion 238 of the sleeve 231. When a section of pipe rotates between the inner and outer knives during a cut, sharp or jagged edges may develop at the newly formed pipe edges. The pipe forming and cutting apparatus 100 may jam due to the sharp edges catching on the sleeve 231 as the newly cut edges are rotated in the sleeve. A more gradual transition to the preferred 0.005 inch clearance between the sleeve 231 and pipe is accomplished with the angled edge 240. In one embodiment, the angled edge 240 forms approximately a 15 degree angle with the vertical axis. In other preferred embodiments, this angle may be optimized for the type of material to be cut or for different cutting applications. By providing a gradual transition for a freshly cut edge of a pipe rotating in the sleeve, the angled edge minimizes potential jamming difficulties.

Referring again to FIG. 4, the support assembly 230 preferably attaches to the upper bracket 233 which is connected to opposite ends of the knife slide block 112. The upper bracket 233 includes an overhead member 233-H bolted to the tops of two vertical members 233-F and 233-B. The bolts pass through oval slots in the overhead member 233-H, which permit angular adjustment of the support sleeves position. The support sleeve is connected to the overhead member 233-H via the sleeve holder 232 and support bolts 234. Each vertical member of the upper bracket 233 includes oval slots 233-S. These oval slots 233-S permit the height of the overhead member 233-H, and hence the position of the support assembly 230, to be adjusted. Although fixed in a radial direction with respect to the pipe 23, the support sleeve 231 moves in the axial direction of the pipe during the cutting operation because the upper bracket 233 is connected to the guide shafts 95 via the knife slide block 112.

Figure 4:
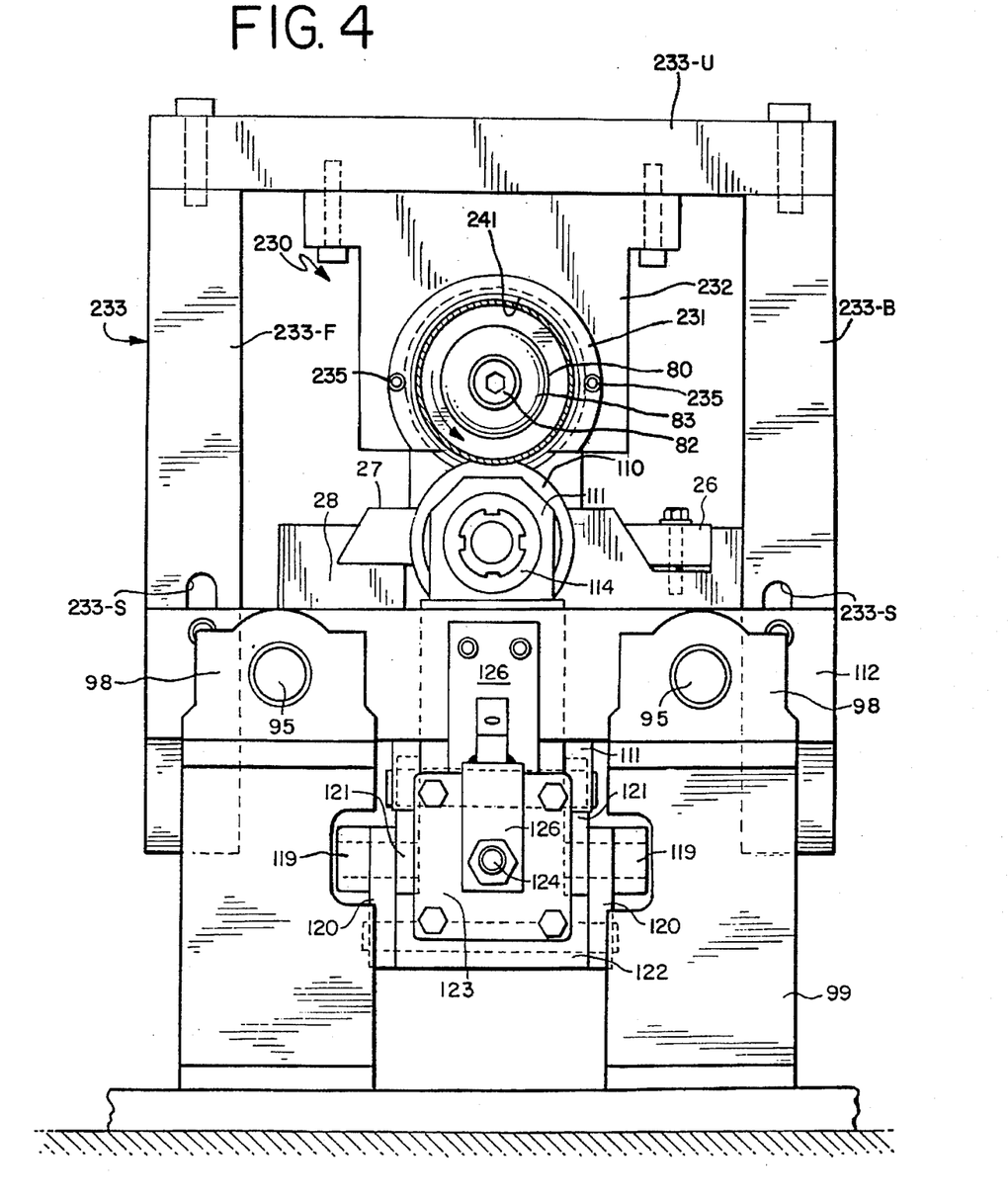
FIG. 4 is an elevation view of the right side of the preferred embodiment of the present invention.

A slide 147 is provided to catch pipe sections 23a that have been severed by the slitter apparatus 75. The slide 147 has a vertical flange 148 that is connected to the cylinder support bracket 126. Thus, the slide 147 also moves in unison with the cutting knives 80, 110 and support sleeve 231 during the cutting operation.

When the outer knife 110 punctures the pipe 23 and overlaps the inner knife 80, the guide shaft system allows the axially moving pipe to push the overlapping knives and the support sleeve, and their connected components, in unison with the pipe. An axial motion cylinder assembly 150 is provided to assist the axial movement of the pipe cutting apparatus 75. As best shown in FIG. 2, this assembly 150 includes a pneumatic cylinder 151 which is supported by a piece of flat stock 152, and held in place by a nut 153. The flat stock 152 is attached to a mounting leg 99. The piston 154 is secured to a second piece of flat stock 155 by a pair of nuts 156. The second piece of flat stock 155 is bolted to the central inner portion of the shaft connector 96. When air is supplied to the cylinder 151 in one direction, the piston 154 extends out of the cylinder, and pushes the shaft connector 96, and its connected components, in the axial direction of the pipe 23. When the air to the cylinder 151 is reversed, the piston 154 retracts and pulls the inner and outer knives 80, 110, back to their starting or "begin-cut" position.

A stop/shock-absorber mechanism 160 is provided to fix the begin-cut position of the inner and outer knives. (See FIG. 2) This mechanism comprises a mounting plate 161 which is attached to the forming head table 28. A commercially available hydraulically-dampened plunger 162 extends through the mounting plate 161 in the axial direction of the pipe. The plunger 162 is held in place by nuts 163, which mate with the threaded portions of the plunger 162. A plastic tip 164 is mounted on the piston (not shown) of the plunger 162. The stop/shock-absorber assembly 160 serves two functions. First, it serves as a stop, which sets the begin-cut position of the pipe slitting apparatus 75. When the axial motion of the piston 154 fully retracts, a strip of flat stock 165 attached to the upper bracket 233 comes to rest again the plastic tip 164 of the fully retracted plunger 162 as shown in FIG. 2. Thus, the nuts and threaded portions of the plunger 162 can be adjusted to set the begin-cut position. Second, when the piston 154 extends and pushes the upper bracket 233 and flat strip 165 away from the stop/shock-absorber mechanism 160, a spring (not shown) in the plunger 162 pushes its piston (not shown) and plastic tip 164 out of the plunger 162. When the upper bracket 233 and flat strip 165 return to the begin-cut operation, they will push the plastic tip 164 and its piston into the plunger 162, until the upper bracket 233 returns to the begin-cut position. While the piston is pushed back into the plunger 162, it provides a hydraulic cushion or shock-absorber effect on the upper bracket 233 and its connected components.

A proximity sensor 170 is also mounted in the mounting plate 161 adjacent to the stop/shock absorber mechanism 160. The proximity sensor 170 is connected to the slitter control circuit, and prevents the slitting process from beginning if the slitter is not all the way back in its begin-cut operation. If the slitter is not in its begin-cut position and the slitting process begins, the axial motion piston 154 will reach its end of travel before the pipe 23 is fully severed.

It may be noted that many of the components of the pipe forming apparatus 10 and slitter apparatus 75 are made of toolsteel (58°–62° HRC), CRS or Mehanite.

The operation of the pipe forming apparatus 10 and slitter apparatus 75 of the preferred embodiment of the present invention will now be described. The operation is similar in many respects to that described in detail in my U.S. Pat. No. 4,567,742 and U.S. Pat. No. 4,706,481. The descriptions of the operation of the apparatus disclosed in those patents are incorporated by reference herein and made a part hereof.

In the combination pipe former/slitter 100 a perforated strip of metal 15 is pulled into the roller housing 16 by the drive rollers 17 and 18. In the roller housing 16, the strip is corrugated and the edges of the strip are formed in the shapes desired to produce a spiral lockseam. Drive rollers 17 and 18 then push the corrugated and edged formed strip through the guide plates 19 and 20 and into the forming head assembly 21. The strip is driven around the rotatable mandrel 60 and inside the lateral bore 30 of the forming head 29. The metal strip is driven between the mandrel 60 and inside the lateral bore 30 of the forming head 29. The metal strip is driven between the mandrel 60 and forming head 29 in a helical manner, so that the outer edges of the strip are positioned adjacent to each other in helical fashion. The folding rollers 36 and 37 cooperate to fold the adjacent, mated edges of the helically wound strip. The lockseam closing roller 52 compresses the folded strip edges against the mandrel 60 to form a tight lockseam 24. During the pipe forming operation, the mandrel 60 is passively rotatable and pivotable, thereby eliminating friction that might otherwise cause the helically wound strip and pipe to lock up between the mandrel 60 and forming head 29.

As the spiral pipe production continues, the pipe 23 moves out of the forming head block 29 in a helical fashion. That is, the pipe 23 moves in its axial direction while it rotates. During the pipe production process, the outer knife 110 is in its standby position, as well as in the begin-cut position. Thus, the pneumatic cylinder assemblies 116, 150 have their respective pistons fully retracted. When the pipe 23 reaches its desired length, air is sent to both of these pneumatic cylinder assemblies to fully extend their respective positions. Thus, the pneumatic cylinder assembly 116 pushes the outer knife 110 upward so that it punctures the pipe 23 and overlaps the inner knife 80. The pneumatic cylinder assembly 150 extends its piston, which pushes all of the components and outer knives and the support sleeve, in the axial direction of the pipe. As the pipe forming machine 10 continues to produce the pipe 23 in a spiral manner, the pipe moves axially with, and rotates between the overlapping inner knife 80 and the outer knife 110. After the pipe completes one revolution, the section of the pipe 23a in front of the overlapping knives will be completely severed and will fall into the slide 147.

Once the cutting process is complete, the air supplied to the pneumatic cylinder assemblies 116, 150 will be reversed. As a result, the outer knife 110 will be returned to its standby position, and the piston 154 will pull all the components connected to the guide shafts 95, including both knives and the support sleeve, back to the begin-cut position.

Referring now to FIGS. 2 and 8, to operate the cutting apparatus 75 in an automatic mode an electrical encoder 27' is coupled to the lower drive roller 17 of the pipe producing machine 10 by a pulley belt 28'. The encoder 27' is adapted to generate pulses corresponding to the number of rotations of the lower drive roller 17. These pulses are transmitted over a cable 29' to a control box 44'. The control box 44' is programmed to check for a first pulse count corresponding to the desired length of the pipe, a second pulse count corresponding to a slow-down point for pipe production, and a third pulse count corresponding to the amount of axial travel of the pipe required for the pipe to be completely cut by the cutting apparatus 75. Three counters 45', 46' and 47' are included in the control box 44'. These counters can be incremented or decremented, one pulse at a time. The first pulse count (i.e., pipe length) is set with the first counter 45', the second pulse count (i.e., slow-down point) is set with the second counter 46', and the third pulse count (i.e., cut length) is set with the third counter 47'. The control box 44' sends pneumatic signals to the pneumatic cylinders 117, 151 over line 48' in response to the first, second and third pulse counts.

The control box 44' also has four control switches 147', 148', 149', and 150'. A first control switch 147' selects manual or automatic control of the pipe cutting apparatus 75. In the manual mode, the second, third and fourth control switches 148', 149' and 150' are operable to manually actuate the pneumatic cylinders 117, 151. That is, the second control switch 148' may be used to move the piston rod 118 in and out of its cylinder 117, and thereby move the outer knife 110 into and out of its cutting position. The third control switch 149' may be used to move the piston 154 in and out of its cylinder 151, and hence slide the inner knife 80, outer knife 110 and support sleeve 231 in the axial direction of the pipe 23. When the first control switch 147' is put into automatic mode, the second, third and fourth control switches 148', 149' and 150' are deactivated, and all three counters 45', 46' and 47' are reset to zero. The pipe cutting apparatus 75 will then automatically cut the pipe 23 into sections 23a as the pipe is produced on the pipe forming apparatus 10.

The control panel 13 is provided with an on/off switch for the pipe cutting machine 75 and three speed adjustment knobs 135', 136' and 137. The first speed adjustment knob 135' controls the production speed of the pipe as it is formed with the pipe forming machine 10. The second speed adjustment knob 136' controls the speed at which the pipe is formed prior to the outer knife 110 moving from its standby position to its cutting position. In order to consistently obtain pipe sections that are cut to the same length, it is important that the pipe 23 travels at a constant, relatively slow speed while the outer knife 110 moves from its standby position to the cutting position. A relatively low speed minimizes the effect of any pulse count errors on the length of the pipe sections 23a. Thus, prior to moving the outer knife 110 to the cutting position, it is preferred that the pipe production is slowed from its fastest, most efficient production speed to a transitional, "slow-down speed." The second speed adjustment knob 136' controls this slow-down speed. The third speed adjustment knob 137' controls the speed of the pipe production while the outer knife 110 moves to, and is in, the cutting position where it cooperates with the inner knife 80 and support sleeve 231 to cut the pipe 23. The cutting speed is usually set at one-half the production speed, or whatever speed is convenient. The speed control knobs 135', 136', 137' can be used to adjust the production speed, slow-down speed and cutting speed of the pipe cutting apparatus 75 during both manual and automatic modes of operation.

The cutting apparatus 75 operates in conjunction with the pipe producing machine 10 in automatic mode in the following manner. The spiral pipe forming process is initiated with the pipe forming machine 10 in a known way. When the leading edge of the pipe 23 begins to leave the forming head 29, the pipe producing machine is temporarily halted, and the pipe cutting apparatus 75 is energized by turning on the on/off switch on the control panel 13. The pneumatic cylinder assemblies 116, 150 are initialized to be in their standby positions, so that the outer knife 110 does not overlap the inner knife 80. The first counter 45', the second counter 46', and the third counter 47' are set to zero. Air is sent to the axial motion cylinder 151 to fully retract piston 154, so that the inner and outer knives are in the begin-cut position.

Typically, the pipe cutting apparatus 75 will be initially operated in its manual mode to cut a few sections of pipe to determine the optimum positional adjustments for the inner knife 80, outer knife 110 and support sleeve 231. The pipe cutting apparatus 75 then run in and out of automatic mode a few times to find the optimum settings for the production speed, slow-down speed, cutting speed, and the pulse counts for the pipe length, slow-down point, and cut length. Once these variables are determined, the pipe cutting apparatus 75 is ready for continuous automatic operation.

In a typical example of automatic operation, the first counter 45' may be set to 1250 pulses for pipe length, the second counter 46' may be set to 1100 pulses for the slow-down point, and the third counter 47' may be set to 375 pulses for the cut length. A cutting cycle begins by resetting all three counters 45', 46', 47' to zero, and by cutting the part of the pipe 23 that extends past the inner and outer knives will in the begin-cut position. This part of the pipe will be referred to as the "lead section".

When the pulse count is at zero in all three counters, the control box 44' sends a first pneumatic pulse signal, via line 48', to the pneumatic cylinder assembly 116. The piston 118 is thereby energized and pushed downward to its extended position. The outer knife 110 is thereby moved to the cutting position where the cutting edges of the inner and outer knives puncture the pipe 23. The first pneumatic pulse signal also reverses the direction of air supplied to the axial motion cylinder 151, so that the piston 154 pushes the shaft connector 96, and all components connected to the guide shafts 95, axially with the pipe. The pipe forming machine 10 continues to produce the pipe 23 in a spiral manner. The pipe 23 thus moves axially with, and rotates between, the overlapping inner knife 80 and the outer knife 110. The encoder 27' generates a train of pulses that correspond tot he length of the next section of pipe being formed, which has its leading edge at the overlapping knives. This section of pipe will be referred to as the "new section" All three counters 45', 46', 47' count in unison as the new section of pipe is formed and the leading section of pipe is severed.

The guide shafts 95 allow the inner and outer knives to move in the axial direction of the pipe under the forces provided by the new section of pipe pushing on the overlapping knives and the extension of the axial motion piston 154. Thus, the inner knife 80, outer knife 110 and support sleeve 231 cooperate to cut the complete circumference of the leading section of pipe as the pipe moves axially and rotates between the inner and outer knives. The third pulse count will be set at the number of pulses corresponding to the axial travel corresponding to slightly more than one pipe rotation. It is generally preferred to have a little overlap in the cut to assure that the leading pipe section is completely severed.

When the third pulse count is reached, the third counter 47' stops counting, but the first and second counters 45' and 46' continue to count as the new section of pipe continues to be produced. Also, the control box 44' sends a second pneumatic pulse signal to the pneumatic cylinder assemblies 116, 150 along line 48'. This second pneumatic signal indicates that the cutting process is completed, and thus operates the pneumatic cylinders 117, 151 to fully retract their respective pistons. The outer knife 110 is then moved to its standby position. The air supplied to the cylinder 151 is also reversed, so that the piston 154 pulls the cutting assembly 75 mounted on the guide shafts 95 back to its begin-cut position. When the third pulse count is reached, the new section of pipe also stops being produced at the cutting speed, and begins to be formed at the production speed.

The new section of pipe will continue to be produced at the production speed, and the first and second counters 45', 46' will continue to count pulses, until the second pulse count is achieved. At that time, the slowdown point will be reached. The second counter 45' will stop counting, and the new section of pipe will be formed at the slow-down speed.

The new section of pipe will continue to be formed at the slow-down speed, and the first counter 45' will continue to count pulses, until the first pulse count is reached. The first pulse count indicates that the new section of pipe has reached its desired length. When the first pulse count is reached, all three counters are reset to zero, and cutting process just described is repeated for the new section of pipe. The same cutting process will continue to be repeated as additional sections of pipe are produced.

The control scheme just described for the pipe cutting machine 75 is generally preferred because the pulse counts for the pipe length, slowdown point and cut length can be set independently, and the cut length is automatically accounted for in the pipe length. Moreover, the foregoing control scheme is preferred for cutting the spiral pipe into sections up to approximately five feet in length. For longer sections of pipe, the first pulse counter can be eliminated, and a limit switch connected to the pipe runoff table can be used to indicate that the desired pipe length has been reached. Other control schemes and considerations are disclosed in my U.S. Pat. No. 4,823,579 issued Apr. 25, 1989. The control schemes disclosed in that patent are specifically incorporated by reference herein.

From the foregoing, an improved apparatus for forming and cutting spiral pipe has been described. The apparatus includes a pipe support assembly that provides a simple way to give extra support to a pipe as it is being cut. Because, in a preferred embodiment, the support assembly surrounds the pipe at the end being cut, any pipe deflection caused by the force of the overlapping knives is minimized and the cut accuracy is improved.

It should be understood that changes and modifications to the preferred embodiment described above will be apparent to those skilled in the art. It is intended that the foregoing description be regarded as illustrative rather than limiting, and that it is the following claims, including all equivalents, which are intended to define the scope of the invention.

I claim:

1. An apparatus for cutting spirally formed pipe, wherein the pipe moves in an axial direction and continuously rotates while it is being formed and cut, comprising:

an inner, rotatable knife positioned inside the pipe;

a radially fixed pipe support assembly positioned outside of the pipe in a fixed radial position with respect to the pipe, wherein the pipe rotates with respect to the pipe support assembly during a cutting operation;

means for moving the outer knife to a position where it overlaps the inner knife; and guide means for allowing the inner knife, the outer knife, and the support assembly to move in the axial direction of the pipe, so that the inner and outer knives will cooperate to cut the pipe and the pipe support assembly will minimize deflection of the pipe when the outer knife overlaps the inner knife and the pipe moves axially and rotates between the inner and outer knives.

2. The apparatus of claim 1, wherein the support assembly further comprises a support sleeve and a support sleeve holder.

3. The apparatus of claim 1, wherein said pipe has a predetermined diameter and said support assembly has an inner diameter greater than the diameter of the pipe.

4. The apparatus of claim 1, wherein the support assembly surrounds the circumference of the pipe.

5. The apparatus of claim 1, wherein the support assembly further comprises a recessed portion defining a gap for allowing the outer knife to engage the pipe.

6. The apparatus of claim 1, wherein the support assembly further comprises a tapered receiving edge.

7. The apparatus of claim 1, wherein the pipe support assembly further comprises:

an upper portion positioned opposite the outer knife, the upper portion having a width extending in an axial direction of the pipe, the width extending over a cutting edge of the inner knife whereby the support assembly limits the deflection of the pipe when the outer knife pierces the pipe and overlaps the outer knife; and a recessed area adjacent the outer knife wherein the outer knife may engage the pipe and overlap the inner knife.

8. The apparatus of claim 2, wherein the support sleeve further comprises an angled edge for preventing the pipe from jamming as it is cut.

9. An apparatus for cutting spirally formed pipe, wherein the pipe moves in an axial direction and continuously rotates while it is being formed and cut, comprising:

a rotatable boom to be positioned inside the pipe;

an inner knife secured to the boom and adapted to rotate with the boom;

an outer, rotatable knife positioned outside the pipe;

a radially fixed pipe support assembly positioned outside of the pipe, said pipe support assembly radially fixed with respect to the pipe, wherein the pipe rotates with respect to the pipe support assembly during a cutting operation;

means for moving the outer knife to a position where it overlaps the inner knife; and guide means for allowing the boom, the inner knife, the outer knife, and the support assembly to move in the axial direction of the pipe, so that the inner and outer knives will cooperate to cut the pipe when the outer knife overlaps the inner knife and the pipe moves axially and rotates between the inner and outer knives.

10. The apparatus of claim 9, wherein the inner knife and the outer knife are adapted to be rotationally driven by contact with the rotating pipe.

11. An apparatus for forming and cutting spiral pipe from a metal strip, wherein the pipe moves in an axial direction and continuously rotates while it is being formed and cut, comprising:

a pivotable, passively rotatable mandrel;

a forming head having a lateral bore;

means for driving the metal strip around the mandrel and inside the lateral bore of the forming head into a spiral cylinder wherein the outer edges of the strip mate;

means detached from the mandrel for compressing the mated edges of strip to form a lockseam in a spiral pipe;

a rotatable boom positioned inside the mandrel;

an inner knife secured to the boom and adapted to rotate with the boom;

an outer, rotatable knife positioned outside the mandrel;

a support assembly fixedly positioned outside of the mandrel in a fixed radial position with respect to the pipe, wherein the pipe rotates with respect to the support assembly during a cutting operation;

means for moving the outer knife to a position where it overlaps the inner knife; and guide means for allowing the boom, inner knife, the outer knife, and the support assembly to move in the axial direction of the pipe, so that the inner and outer knives will cooperate to cut the pipe when the outer knife overlaps thinner knife and the pipe moves axially and rotates between the inner and outer knives.

12. An improved apparatus for cutting spirally formed pipe having a boom positioned in the pipe, an inner knife mounted on the boom, an outer knife positioned outside the pipe opposite said inner knife, and an assembly for moving the outer knife into an overlapping position with the inner knife, wherein the improvement comprises:

a pipe support assembly positioned outside the pipe for minimizing deflection of the pipe away from the outer knife, said pipe support assembly fixed in a radial direction with respect to the pipe and wherein the pipe continuously rotates within the support assembly during a cutting operation.

13. The apparatus of claim 12, wherein the support assembly further comprises a support sleeve and a support sleeve holder.

14. The apparatus of claim 12, wherein said pipe has a predetermined diameter and said support assembly has an inner diameter greater than the diameter of the pipe.

15. The apparatus of claim 12, wherein the support assembly surrounds the circumference of the pipe.

16. The apparatus of claim 12, wherein the support assembly further comprises a recessed portion defining a gap for allowing the outer knife to engage the pipe.

17. The apparatus of claim 12, wherein the support assembly further comprises a tapered receiving edge.

18. The apparatus of claim 13, wherein the support sleeve further comprises an angled edge for preventing the pipe from jamming as it is cut.

19. The apparatus of claim 14, wherein the inner diameter of the support assembly is 0.010 inches greater than the diameter of the pipe.

* * * * *

UNITED STATES PATENT AND TRADEMARK OFFICE
CERTIFICATE OF CORRECTION

PATENT NO.   :   5,636,541
DATED        :   June 10, 1997
INVENTOR(S)  :   Wilhelmus P. H. Castricum It is certified that error appears in the above-indentified patent and that said Letters Patent is hereby corrected as shown below:

In claim 11, line 26, replace "thinner" with --the inner--.

Signed and Sealed this

Nineteenth Day of October, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.    : 5,636,541
DATED         : June 10, 1997
INVENTOR(S)   : Wilhelmus P.H. Castricum It is certified that error appears in the above-identified patent and that said Letters Patent is hereby corrected as shown below:

Column 12, claim 1,
Lines 42-43, insert a new paragraph, -- an outer, rotatable knife positioned outside the pipe; --

Signed and Sealed this

Eighteenth Day of December, 2001

Attest:

Attesting Officer

JAMES E. ROGAN
Director of the United States Patent and Trademark Office